United States Patent
Nechushtan

[19]

[11] Patent Number: 5,954,364
[45] Date of Patent: Sep. 21, 1999

[54] SPACE FRAME FOR VEHICLE

[75] Inventor: Oded Nechushtan, Marina del Rey, Calif.

[73] Assignee: Raceco International, Inc., Cerritos, Calif.

[21] Appl. No.: 08/931,727

[22] Filed: Sep. 16, 1997

Related U.S. Application Data

[60] Provisional application No. 60/026,225, Sep. 17, 1996.

[51] Int. Cl.⁶ ................................................. B62D 21/00
[52] U.S. Cl. .......................... 280/781; 280/785; 280/790; 296/203; 296/205
[58] Field of Search .................................... 280/781, 785, 280/790, 795, 796; 296/203, 205

[56] References Cited

U.S. PATENT DOCUMENTS

| | | | |
|---|---|---|---|
| Re. 33,769 | 12/1991 | Harrod | 296/177 |
| 880,461 | 2/1908 | McGiffin et al. | 296/84.1 |
| 1,027,528 | 5/1912 | Douglas | 296/84.1 |
| 1,057,570 | 4/1913 | McQuillan | 296/84.1 |
| 1,167,609 | 1/1916 | Ackerman | 296/84.1 |
| 1,878,584 | 9/1932 | Jones | 296/84.1 |
| 3,759,540 | 9/1973 | Olson | 280/790 X |
| 4,163,578 | 8/1979 | Watson | 296/204 |
| 4,205,872 | 6/1980 | Bollinger | 296/205 |
| 4,453,763 | 6/1984 | Richards | 296/185 |
| 4,592,571 | 6/1986 | Baumann et al. | 280/756 |
| 4,660,345 | 4/1987 | Browning | 52/648 |
| 4,666,183 | 5/1987 | Azzarello | 280/756 |
| 4,700,982 | 10/1987 | Kurakoa et al. | 296/107 |
| 4,709,958 | 12/1987 | Harrod | 296/177 |
| 4,773,695 | 9/1988 | Jones et al. | 296/77.1 |
| 4,799,708 | 1/1989 | Handa et al. | 280/796 |
| 4,804,199 | 2/1989 | Picard | 280/781 X |
| 4,830,402 | 5/1989 | Matthias et al. | 280/756 |
| 4,950,026 | 8/1990 | Emmons | 296/203 |
| 4,955,664 | 9/1990 | Friedrich | 296/204 |
| 5,042,835 | 8/1991 | Burns | 280/756 |
| 5,094,313 | 3/1992 | Mauws | 180/210 |
| 5,209,541 | 5/1993 | Janotik | 280/785 X |
| 5,284,360 | 2/1994 | Busch et al. | 280/756 |
| 5,458,393 | 10/1995 | Benedyk | 296/205 |

FOREIGN PATENT DOCUMENTS

| | | |
|---|---|---|
| 954992 | 9/1995 | France . |
| 130026 | 5/1990 | Taiwan . |
| 130471 | 7/1990 | Taiwan . |

OTHER PUBLICATIONS

Auto Magazine, Feb. 1995.
Auto Magazine, Nov. 1991.

*Primary Examiner*—Christopher P. Ellis
*Attorney, Agent, or Firm*—Michael J. Brown; Irving M. Fishman

[57] ABSTRACT

A space frame for a low profile, light truck with triangulation members of the space frame located under the floor is described having a passenger compartment, and front and rear wheel assemblies. The space frame comprises a front clip portion above the front wheel assembly, a rear clip portion above the rear wheel assembly, and a tub portion supporting the base of the passenger compartment. The tub portion includes a plurality of structural members at least two of which are disposed in horizontal coplanar relation relative to one another wherein additional structural members of the tub portion are connected together in a triangulated configuration at an elevation at or below the at least two horizontal coplanar structural members of the tub portion. Foldable rollbars are also provided.

17 Claims, 2 Drawing Sheets

SPACE FRAME FOR VEHICLE

This application claims the invention disclosed in, and claims the benefit of, U.S. provisional application serial No. 60/026,225, filed by the same inventor on Sep. 17, 1996, entitled "TRIANGULATED TUBULAR SPACE FRAME, LOW PROFILE, LIGHT TRUCK WITH FOLDABLE ROLLBARS HAVING TRIANGULATION UNDER THE FLOOR".

FIELD OF INVENTION

The invention relates to the field of land vehicles, especially vehicles for off-road driving.

BACKGROUND OF THE INVENTION

Space frames for vehicles are generally known and are typically found in vehicles intended for use in off-road driving (e.g., "dune buggies" and "all-terrain vehicles") or racing.

Space frames may include a roll cage to provide strength to the frame and protection for the occupants in the event of a roll-over. A space frame for an off-road vehicle typically includes a roll cage since off-road driving ordinarily subjects the frame to severe loads due to the sudden impacts upon the vehicle caused, for example, by striking hard objects such as boulders, trees and mounds, by traveling over uneven terrain, and by falling into holes. Such impacts may further stress the vehicle frame (such as by twisting) by being unbalanced relative to the frame (for example, the load on only one of the front corners produced by one of the front tires impacting a large rock).

The weight of the space frame is also a primary consideration. A space frame is ordinarily desired to be as light as possible to increase the speed, agility and fuel economy of the vehicle, and decrease the material cost of the space frame. On the one hand, large members are typically stronger than small members and, as discussed above, the strength of the frame is of paramount importance.

In addition, where the vehicle is intended for military application, greater mobility, higher speeds, low weight and low profile become quite important. Of equal importance in this capacity is the payload to curbweight ratio, which is desired to be as high as possible. In most vehicles the ratio is in the order of 0.3:1. For military applications, which often require high payloads, the ratio should be considerably higher. Advantageously, the payload to curbweight ratio should be about 0.75:1 to 1:1 or even higher.

These advantages, especially those related to the military application requirements are provided by the triangulated tubular space frame for a low profile, light truck with foldable rollbars where the triangulation elements of the space frame are substantially, if not entirely, below the tub or floor according to the present invention as described in more detail below.

SUMMARY OF THE INVENTION

The present invention provides a triangulated tubular space frame for a low profile, light truck having a passenger compartment, and front and rear wheel assemblies, and where substantially all, if not all of the triangulated tubular space frame's structural members are below the floor. The space frame comprises a front clip portion above the front wheel assembly, a rear clip portion above the rear wheel assembly, and a tub portion supporting the base of the passenger compartment. The tub portion includes a plurality of structural members at least two of which are disposed in horizontal coplanar relation relative to one another, wherein additional structural members of the tub portion are connected together in a triangulated configuration at an elevation at or below the plane of the at least two horizontal coplanar structural members of the tub portion.

The structure of the tub portion, including the two horizontal coplanar structural members with additional structural members connected in a triangulated configuration, provides sufficient strength to the tub portion without the need for a roll cage. The absence of a roll cage is a significant advancement since, as discussed above, a frame for an off-road vehicle may be subjected to substantial forces due to impacts with boulders, rocks and the like, which forces may be unbalanced relative to the frame, thereby increasing the severity of such forces.

Among the advantages of not having a roll cage are: improving access to the passenger compartment by both passengers and equipment; enabling larger equipment and structures to be placed in the passenger compartment; and facilitating positioning of equipment and structures mounted in the passenger compartment, especially equipment and structures which would extend beyond a typical roll cage and might otherwise be obstructed thereby. Another advantage of not having a roll cage is the weight of the frame is reduced. A further advantage of not having the roll cage is the reduction of the vehicle profile, a significant advantage in military applications.

For convenience and where desired, foldable rollbars may also be provided.

These and other features and advantages of the invention will be more fully understood from the following Description of the Preferred Embodiment together with the figures of the accompanying Drawings.

BRIEF DESCRIPTION OF THE DRAWINGS

Corresponding reference numerals indicate corresponding parts throughout the drawings.

DESCRIPTION OF THE PREFERRED EMBODIMENTS

Figure 1:
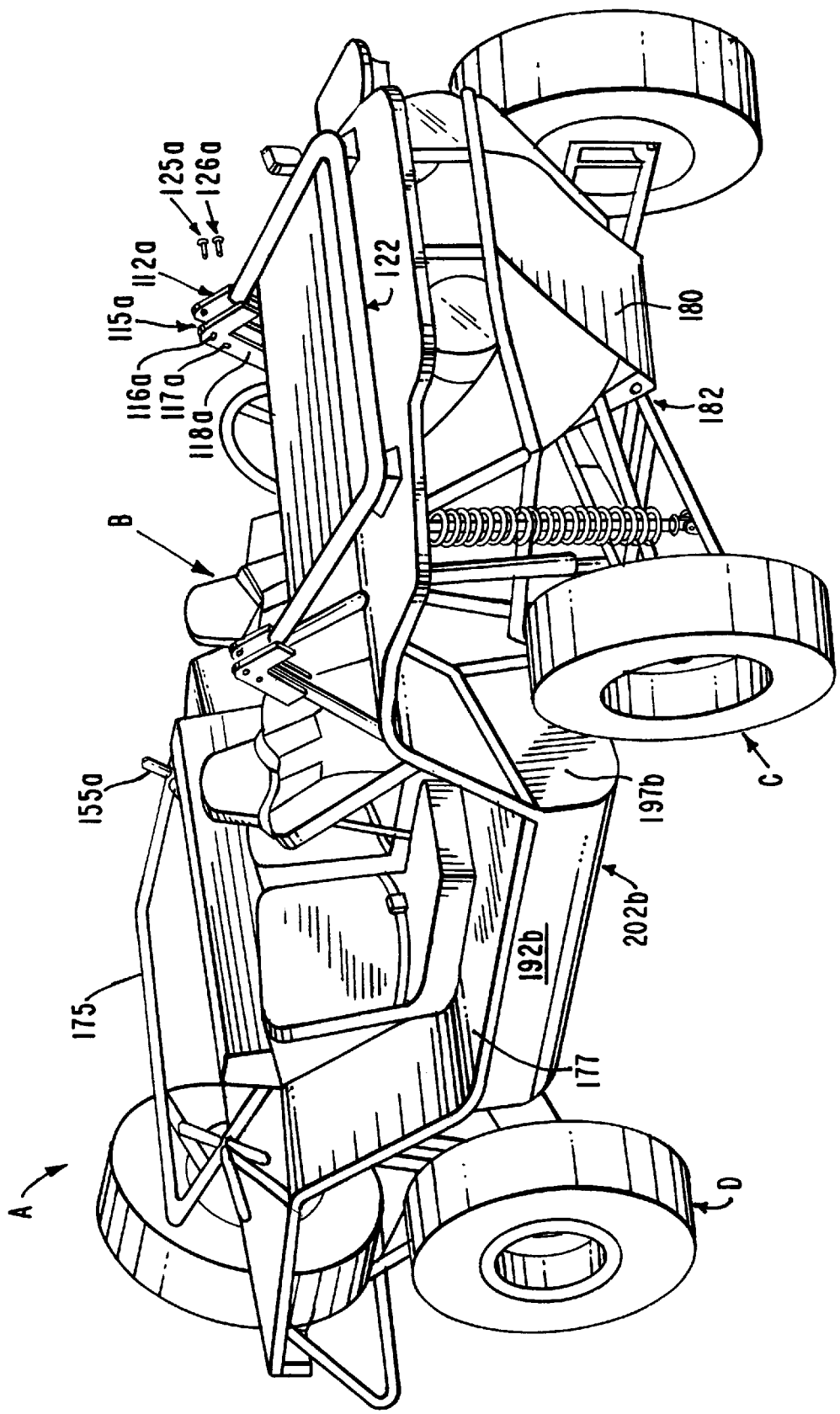
FIG. 1 is a front perspective view of a vehicle incorporating a space frame of the present invention.

Referring to the drawing in detail, and in particular FIG. 1, numeral 10 refers generally to a space frame for a vehicle A having a passenger compartment B, and front and rear wheel assemblies C, D. Space frame 10 includes a front clip portion 12, a tub portion 15, and a rear clip portion 17. Front and rear clip portions 12, 17 are disposed above front and rear wheel assemblies C, D, respectively. Tub portion 15 is disposed between front and rear clip portions 12, 17 and supports the base of passenger compartment B. Space frame 10 includes structural members, preferably tubes, connected together in a triangulated configuration.

Figure 2:
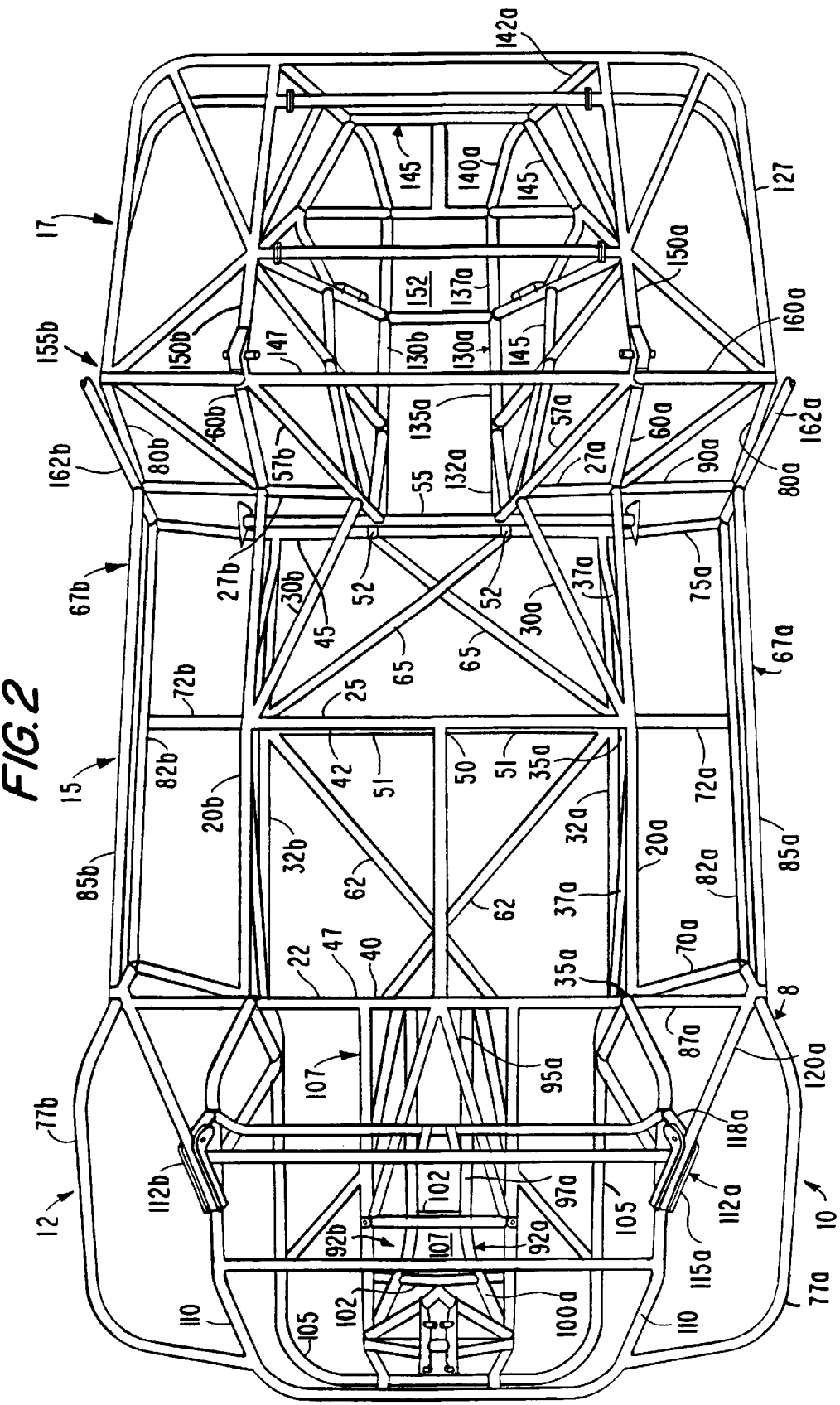
FIG. 2 is a plan view of the space frame of the invention incorporated into the vehicle of FIG. 1.

As used herein, "joint" refers to a welded connection between two or more ends of tubes of space frame 10. In the description which follows, the parentheticals "(tub)", "(basket)", "(front clip)", and "(rear clip)" are used to aid in identifying the relative locations of the elements of the invention. As used herein, "a" following a reference numeral refers to the left side of space frame 10 and "b" following a reference numeral refers to the right side of space frame 10. In the drawings, FIG. 1 presents the right side of the vehicle incorporating the space frame of the invention. In FIG. 2, the orientation of the space frame, relative to the label "FIG. 2" presents the front of the vehicle at the left of the drawing and the left side of the space frame is directly above the label "FIG. 2".

Tub Portion

As shown in FIG. 2, tub portion 15 includes upper left and right tubes (tub) 20a, 20b connected by laterally extending upper front and intermediate tubes (tub) 22, 25, and upper left and right rear tubes (tub) 27a, 27b. The upper left and right rear tubes (tub) 27a, 27b are inclined relative to upper intermediate tube (tub) 25 in a horizontal plane. Upper left and right diagonal tubes (tub) 30a, 30b extend rearwardly from the joint including the upper intermediate tube (tub) 25, and upper left and right tubes 20a, 20b.

Disposed below upper left and right tubes (tub) 20a, 20b, respectively, are lower left and right tubes (tub) 32a, 32b which have tubes extending therebetween. Extending between lower left and right tubes (tub) 32a, 32b are laterally extending lower front, intermediate and rear tubes (tub) 40, 42, 45. The lower front and intermediate tubes (tub) 40, 42 are directly below the upper front and intermediate tubes (tub) 22, 25. Connected between the upper and lower front tubes (tub) 22, 40 are inclined front tubes (tub) 47. Connected between upper and lower intermediate tubes (tub) 25, 42 are vertical and inclined intermediate tubes (tub) 50, 51.

The lower rear tube (tub) 45 is disposed forwardly of the upper rear tubes (tub) 27a, 27b. Extending upwardly from the lower rear tube (tub) 45 are two vertical tube stubs (tub) 52 on which is mounted a lateral pipe support (tub) 55 from which the rear wheel suspensions (not shown) are hung.

Extending upwardly from pipe support (tub) 55 generally adjacent to tube stubs (tub) 52 are left and right rear tubes (rear clip) 57a, 57b which are inclined laterally and rearwardly. The portion of left and right rear tubes (rear clip) 57a, 57b below upper left and right rear tubes (tub) 27a, 27b are considered part of tub portion 15. Extending to left and right rear tubes (rear clip) 57a, 57b are upper left and right diagonal tubes (tub) 30a, 30b (discussed above).

Extending upwardly from lower rear tube (tub) 45 generally adjacent to and inboard of the ends of pipe support (tub) 55 are left and right rear tubes (rear clip) 60a, 60b which are also inclined in the rearward direction. The portion of left and right rear tubes (rear clip) 60a, 60b below upper left and right rear tubes (tub) 27a, 27b are part of tub portion 15. Upper left and right tubes 20a, 20b (tub) extend to left and right tubes (rear clip) 60a, 60b. Upper left and right rear tubes (tub) 27a, 27b extend between left and right rear tubes (rear clip) 57a, 57b, and left and right rear tubes (rear clip) 60a, 60b, as shown in FIG. 2.

Lower forward diagonal tubes (tub) 62 are connected between lower front tube 40, and the joint including lower intermediate tube (tub) 42 and lower left and right side tubes (tub) 32a, 32b. Lower forward diagonal tubes (tub) 62 form an X-shaped configuration as shown in FIG. 2. Lower rearward diagonal tubes 65 are connected between the lower rear tube (tub) 45, and the joint including lower intermediate tube (tub) 42 and lower left and right side tubes (tub) 32a, 32b. Lower rearward diagonal tubes 65 form an X-shaped configuration.

The tubular structural members of tub portion 15 thereby define triangulated configurations in vertical planes (e.g., left and right inclined tubes (tub) 37a, 37b, and inclined intermediate tubes 51 (tub)) and horizontal planes (e.g., upper left and right diagonal tubes (tub) 30a, 30b, and lower forward and rearward diagonal tubes (tub) 62, 65). These triangulated configurations contribute to the strength of tub portion 15 which, as described above, does not require a roll cage.

Basket Portions

Space frame 10 includes left and right basket portions 67a, 67b are disposed laterally on opposite sides of tub portion 15. Since left and right basket portions 67a, 67b are symmetrical, only left basket portion 67a will be described in detail. Left basket portion 67a includes lower left front and intermediate tubes (basket) 70a, 72a and rear member (basket) 75a. Lower left rear member (basket) 75a is preferably of rectangular cross section, although tubes may also be used. Lower left front tube and rear member (basket) 70a, 75a extend laterally and incline upwardly from the joint including the front and rear ends of lower left tube (tub) 32a. Lower left intermediate tube (basket) 72a extends laterally and horizontally from lower left tube (tub) 32a such that the outboard ends of the lower left front and intermediate tubes (basket), and rear member (basket) 70a, 72a, 75a have generally the same elevation.

Extending upwardly in a forward direction from lower left front tube (basket) 70a is left front tube (front clip) 77a which is part of front clip portion 12. Extending upwardly in a rearward direction from lower left rear member (basket) 75a is left rear tube (rear clip) 80a which is part of rear clip portion 17.

Left basket portion 67a includes a lower left tube (basket) 82a welded to the outboard ends of lower left front and intermediate tubes (basket) 70a, 72a and to the outboard end of lower left rear member (basket) 75a. Since the ends of lower left front and intermediate tubes and rear member (basket) 70a, 72a, 75a have the same elevation, lower left tube (basket) 82a is generally horizontal though at a raised elevation relative to lower left tube (tub) 32a.

Left basket portion 67a includes an upper left tube (basket) 85a the ends of which are welded between left front tube (front clip) 77a and left rear tube (rear clip) 80a such that upper left tube (basket) 85a has generally the same elevation as upper left tube (tub) 20a. Upper left front tube (basket) 87a extends between left front tube (front clip) 77a and the joint containing the front end of upper left tube (tub) 20a. Upper left rear tube (basket) 90a extends between left rear tube (rear clip) 80a and the joint containing the rear end of upper left tube (tub) 20a.

Front Clip Portion

Front clip portion 12 is the region of space frame 10 forward of tub portion 15. Front clip portion 12 includes left and right front tubes (front clip) 77a, 77b extending forward from lower left and right tubes (basket) 82a, 82b. Left and right front tubes 77a, 77b extend beyond left and right basket portions 67a, 67b and curve inwardly to define part of the front of front clip portion 12.

Lower left and right tubes (front clip) 92a, 92b extend from lower front tube (tub) 40. Lower left and right tubes (front clip) 92a, 92b are symmetrical relative to one another; as a result, only lower left tube (front clip) 92a will be described in detail. Lower left tube (front clip) 92a has a rear portion (front clip) 95a which adjoins lower front tube (tub) 40 and is forward and downwardly inclined. Lower left tube (front clip) 92a includes a horizontal intermediate portion (front clip) 97a forward of and adjoining rear portion (front clip) 95a. Lower left tube (front clip) 92a also has an upwardly inclined front portion (front clip) 100*a* forward of and adjoining intermediate portion (front clip) 97*a*. Three lateral front tubes 102 are welded between lower left and right tubes (front clip) 92*a*, 92*b*.

Front clip portion 12 includes an intermediate tube (front clip) 105 having a U-shape (in the horizontal plane) the legs of which are welded to the joint including the forward ends of upper left and right side tubes (tub) 20*a*, 20*b*. Welded between intermediate tube (front clip) 105, and lower left and right tubes (front clip) 92*a*, 92*b* are tubes defining a cage portion 107 for supporting a differential and steering gear (not shown).

Intermediate tube (front clip) 105 has the same general elevation as upper left and right tubes (tub) 20*a*, 20*b*. Rear and intermediate portions (front clip) 95*a*, 95*b*, 97*a*, 97*b* of lower left and right tubes (front clip) 92*a*, 92*b* have generally the same elevation as lower left and right tubes (tub) 32*a*, 32*b*. This facilitates carrying of mechanical loads between the front clip and tub portions 12, 15.

Front clip portion 12 also has an upper tube (front clip) 110 including left and right legs, the ends of which are welded to the joint including the forward ends of the upper left and right tubes (tub) 20*a*, 20*b*. The left and right legs of upper tube (front clip) 110 extend forwardly and upwardly to a U-shaped portion (in the horizontal plane). The forward portion of upper tube (front clip) 110 is intersected by left and right front tubes (front clip) 77*a*, 77*b*.

Front clip portion 12 includes left and right front roll bar bases 112*a*, 112*b*, as shown in FIG. 1. Since left and right front roll bar bases 112*a*, 112*b* are symmetrical, only left front roll bar base will be described in detail. Left front roll bar base 112*a* includes a left front channel 115*a* welded to upper tube (front clip) 110. A left inner tube (front roll bar) 118*a* is welded between left front channel 115*a* and upper tube (front clip) 110. A left outer tube (front roll bar) 120*a* is welded between left front channel 115*a* and the joint including the forward end of upper left tube (basket) 85*a*.

Left front channel 115*a* is oriented such that the U-shaped cross section thereof faces forwardly when viewed from above. Left front channel 115*a* has upper and lower pairs of axially aligned holes (front channel) 116*a*, 117*a* formed in opposite sides of thereof.

A U-shaped front roll bar 122 includes legs each of which has a pair of passages (front roll bar) in the respective ends thereof. When the ends of front roll bar 122 are placed in the respective left and right front channels 115*a*, 115*b*, the passages (front roll bar) align with corresponding pairs of holes (front channel) 116*a*, 117*a*. Front roll bar 122 is supported in left and right front channels 115*a*, 115*b*, by insertion of removable left upper and lower pins (front) 125*a*, 126*a* (shown removed in FIG. 1) through the corresponding pairs of holes (front channel) 116*a*, 117*a* and the passages (front roll bar) as shown in FIG. 1. If both upper and lower front pins 125*a*, 126*a* are removed, front roll bar 122 may be pivoted forwardly about lower front pins to the position illustrated in FIG. 1.

Rear Clip Portion

Rear clip portion 17 is the region of the frame rearward of tub portion 15. Rear clip portion 17 includes left and right outer tubes (rear clip) 80*a*, 80*b* extending rearwardly from lower left and right tubes (basket) 82*a*, 82*b*. Left and right outer tubes (rear clip) 80*a*, 80*b* extend upwardly and rearwardly to a joint containing the ends of upper exterior tube (rear clip) 127 having a U-shape (in the horizontal plane). Upper exterior tube (rear clip) 127 extends rearwardly and defines part of the rear end of space frame 10.

Rear clip portion 17 includes lower left and right tubes (rear clip) 130*a*, 130*b* extending rearwardly from lower rear tube (tub) 45. Lower left and right tubes (rear clip) 130*a*, 130*b* are symmetrical so only lower left tube (rear clip) will be described in detail. Lower left tube (rear clip) 130*a* has a front portion (rear clip) 132*a* which adjoins lower rear tube (tub) 45 and is inclined downward in the rearward direction. Lower left tube (rear clip) 130*a* further includes, in rearward order from front portion (rear clip) 132*a*, a horizontal intermediate portion (rear clip) 135*a*, an upward and rearwardly inclined intermediate portion (rear clip) 137*a*, an upward and rearwardly inclined intermediate portion (rear clip) 140*a*, and an upward and forwardly inclined rear portion (rear clip) 142*a*.

Rear clip portion 17 includes an intermediate tube assembly (rear clip) 145 having a U-shape (generally in the horizontal plane) the legs of which are welded to the joint containing the rearward ends of the left and right rear tubes (rear clip) 57*a*, 57*b*. Intermediate tube assembly (rear clip) 145, at the rearward portion thereof, is welded to lower left and right tubes (rear clip) 130*a*, 130*b*. Intermediate tube assembly (rear clip) 145 has a plurality of segments attached to one another in end-to-end relation as shown in FIG. 2.

Intermediate tube assembly (rear clip) 145 has the same general elevation as upper left and right tubes (tub) 20*a*, 20*b*. Rear and intermediate portions (front clip) 132*a*, 132*b*, 135*a*, 135*b*, 137*a*, 137*b* of lower left and right tubes (rear clip) 130*a*, 130*b* have generally the same elevation as lower left and right tubes (tub) 32*a*, 32*b*. This facilitates carrying of mechanical loads between the rear clip and tub portions 12, 15. Combined with the load carrying advantages of lower left and right tubes (front clip) 92*a*, 92*b* and intermediate tube (front clip) 105 (discussed above), this provides a generally continuous bi-level path for carrying loads from the front to the rear of the space frame 10.

Rear clip portion 17 includes an upper lateral tube (rear clip) 147 to which are welded the upper ends of left and right rear tubes (rear clip) 57*a*, 57*b*, 60*a*, 60*b*, and left outer tubes (rear clip) 80*a*, 80*b*. Horizontal left and right upper interior tubes (rear clip) 150*a*, 150*b* extend between upper lateral tube (rear clip) 147 and upper exterior tube (rear clip) 127. Welded between left and right upper interior tubes (rear clip) 150*a*, 150*b*, intermediate tube assembly (rear clip) 145, and lower left and right tubes (rear clip) 130*a*, 130*b* are tubes defining a basket portion 152 for supporting the engine and transaxle (not shown).

Rear clip portion 17 includes left and right rear roll bar bases 155*a*, 155*b*. Since left and right rear roll bar bases 155*a*, 155*b* are symmetrical, only left rear roll bar base will be described in detail. Left rear roll bar base 155*a* includes a left rear channel (not shown) welded to upper lateral tube (rear clip) 147 adjacent to the left end thereof. An left inner tube (rear roll bar) 160*a* is welded between left rear channel and upper lateral tube (rear clip) 147. An outer tube (rear roll bar) 162 projects upward and is welded between left rear channel and the joint containing the rearward end of upper left tube (basket) 85*a*.

Left rear channel is oriented such that the U-shaped cross section thereof faces rearwardly when viewed from above. Left rear channel has upper and lower pairs of axially aligned holes (rear channel) formed in opposite sides of thereof. The holes (rear channel) support upper and lower pins which, in turn, support a U-shaped rear roll bar 175 in the same fashion as described above regarding left front channel 115*a*. The details of this structure may therefore be readily ascertained from the description above of the structure pivotally supporting front roll bar 122 in left and right front channels 115a, 115b. Rear roll bar 175 is therefore able to pivot downwardly in the same fashion as front roll bar 122, except rear roll bar pivots downward in the rearward direction whereas front roll bar pivots downward in the forward direction.

Body Plates

Body plates of metal are attached to selected exterior tubes and members as shown in FIG. 1. For example, a floor plate 177 is bolted to the tubes of tub portion 15 contained in the plane defined by upper left and right tubes (tub) 20a, 20b to define the floor of the passenger compartment.

Front inclined skid plate 180 is bolted to the undersides of inclined front portions (front clip) 100a, 100b of lower left and right tubes (front clip) 92a, 92b. Front horizontal skid plate 182 is bolted to the undersides of intermediate portions (front clip) 97a of lower left and right tubes (front clip) 92a, 92b. Since rear portions (front clip) 95a, 95b of left and right tubes (front clip) 92a, 92b are downwardly inclined, front horizontal skid plate 182 is lower than the plane containing lower left and right tubes (tub) 32a, 32b. Preferably, all parts of tub portion 15 are at or above that plane which therefore represents the lowest elevation of tub portion 15.

Rear inclined skid plates (not shown) are bolted to the undersides of inclined intermediate portions (rear clip) 137a, 137b, 140a, 140b of lower left and right tubes (rear clip) 130a, 130b. Rear horizontal skid plate (not shown) is bolted to the undersides of horizontal intermediate portions (front clip) 135a, 135b of lower left and right tubes 130a, 130b. Since front portions (front clip) 132a, 132b of lower left and right tubes 130a, 130b are downwardly inclined, rear horizontal skid plate 190 is lower than the plane containing lower left and right tubes (tub) 32a, 32b.

Metal plates are bolted to the tubes of left and right basket portions 67a, 67b. Since left and right basket portions 67a, 67b are symmetrical, only the plates for right basket portion, shown in FIG. 1, will be described in detail. Right outer side basket plate 192b is bolted to the outer sides of lower and upper right tubes (basket) 82b, 85b. Right inner side basket plate 192b is bolted to the outer sides of lower and upper right tubes (tub) 20b, 32b. Right front basket plate 197b is bolted to the front sides of lower and upper right front tubes (basket) 70b, 87b. Right rear basket plate (not shown) is bolted to the rear sides of lower and upper right rear member and tube (basket) 75b, 90b. Right bottom basket plate 202b is bolted to the bottom sides of lower right tube (tub) 32b and lower right tube (basket) 82b. Right bottom basket plate 202b is laterally inclined upwardly from lower right tube (tub) 32b and lower right tube (basket) 82b due to the different elevations thereof. These plates define a container in which articles may be stored. A lid plate may also be provided across upper right tube (tub) 20b and tube (basket) 85b to cover container. The lid plate may be hinged to either upper right tube (tub) 20b or upper tube (basket) 85b or attached by other suitable means.

If vehicle A, when traveling forward, encounters an obstruction opposite the front center thereof, front inclined skid plate 180 rides up on the obstruction and, if the vehicle continues to proceed, front horizontal skid plate 182 rides across the obstruction. Preferably, the weight of the vehicle, imparted through skid plates 180, 182, crushes the obstruction sufficiently to provide a clearance between the obstruction and the plane containing lower left and right tubes (tub) 32a, 32b.

If vehicle A, when traveling in reverse, encounters an obstruction opposite the rear center thereof, rear inclined skid plates and horizontal skid plate ride up on the obstruction in the same manner as front skid plates 180, 182, as described hereinabove. If the wheels of vehicle A roll over an obstruction, the upward lateral inclination of bottom basket plates 202a, 202b provide greater vertical clearance than lowest elevation of tub portion 15 (i.e., the plane containing lower left and right tubes (tub) 32a, 32b).

While the invention has been described by reference to preferred embodiments, it should be understood numerous changes may be made within the spirit and scope of the inventive concepts described. Accordingly, the invention is not intended to be limited to the disclosed embodiments. Rather, the invention is intended to have the full scope permitted by the language of the following claims.

What is claimed is:

1. A space frame for a vehicle having a passenger compartment, and front and rear wheel assemblies, said space frame comprising:
    a front clip portion above the front wheel assembly;
    a rear clip portion above the rear wheel assembly; and
    a tub portion supporting the base of the passenger compartment, said tub portion including a plurality of structural members at least two of which are disposed in horizontal coplanar relation relative to one another wherein additional said structural members of said tub portion are connected together in a triangulated configuration at an elevation at or below said at least two horizontal coplanar structural members of said tub portion.

2. A space frame as set forth in claim 1 wherein substantially all of said structural members of said tub portion are elevated at or below said at least two horizontal coplanar structural members of said tub portion.

3. A space frame as set forth in claim 1 and further comprising a plate member overlying said at least two horizontal coplanar structural members of said tub portion wherein said plate member defines a floor supported by said structural members of said tub portion.

4. A space frame as set forth in claim 3 and further comprising a seat structure mounted on the upper surface of said floor.

5. A space frame as set forth in claim 1 wherein said structural members of said tub portion comprise tubes.

6. A space frame as set forth in claim 1 and further comprising a basket portion connected laterally to one side of said tub portion.

7. A space frame as set forth in claim 6 wherein said basket portion includes structural members comprising tubes.

8. A space frame as set forth in claim 1 wherein said tub portion includes longitudinal lower left and right tubes which define a bottom side planar region of said tub portion, said tub portion further including longitudinal upper left and right tubes which define a top side planar region of said tub portion, said left upper and lower tubes defining a left side planar region of said tub portion, and said right upper and lower tubes defining a right side planar region of said tub portion, said tub portion further including an X-shaped structure disposed in said bottom side planar region, said X-shaped structure having at least one end connected to said lower left and right tubes.

9. A space frame as set forth in claim 1 and further comprising a front clip portion connected to the front of said tub portion.

10. A space frame as set forth in claim 9 wherein said front clip portion includes structural members comprising tubes.

11. A space frame as set forth in claim 9 wherein said tub portion includes longitudinal lower left and right tubes which define a bottom side planar region of said tub portion, said tub portion further including longitudinal upper left and right tubes which define a top side planar region of said tub portion, said left upper and lower tubes defining a left side planar region of said tub portion, and said right upper and lower tubes defining a right side planar region of said tub portion, said front clip portion including longitudinal upper left and right load carrying tubes mechanically connected to said upper left and right tubes of said tub portion, said front clip portion further including longitudinal lower left and right load carrying tubes mechanically connected to said lower left and right tubes of said tub portion thereby facilitating carrying of mechanical loads between said front clip and tub portions.

12. A space frame as set forth in claim 1 and further comprising a rear clip portion connected to the rear of said tub portion.

13. A space frame as set forth in claim 12 wherein said rear clip portion includes structural members comprising tubes.

14. A space frame as set forth in claim 12 wherein said tub portion includes longitudinal lower left and right tubes which define a bottom side planar region of said tub portion, said tub portion further including longitudinal upper left and right tubes which define a top side planar region of said tub portion, said left upper and lower tubes defining a left side planar region of said tub portion, and said right upper and lower tubes defining a right side planar region of said tub portion, said rear clip portion including longitudinal upper left and right load carrying tubes mechanically connected to said upper left and right tubes of said tub portion, said rear clip portion further including longitudinal lower left and right load carrying tubes mechanically connected to said lower left and right tubes of said tub portion thereby facilitating carrying of mechanical loads between said rear clip and tub portions.

15. The space frame of claim 1 wherein the vehicle is a low profile, light truck with foldable rollbars.

16. A vehicle comprising the tubular space frame of claim 1.

17. The vehicle of claim 16, where said vehicle is a low profile, light truck with foldable rollbars.

* * * * *